INVENTOR:
JOHN J. McCOY

United States Patent Office 3,579,311
Patented May 18, 1971

3,579,311
PROCESS AND APPARATUS FOR PRODUCING
$UO_2$ POWDER
John J. McCoy, San Jose, Calif., assignor to
General Electric Company
Filed Apr. 25, 1968, Ser. No. 724,119
Int. Cl. C01g 43/02
U.S. Cl. 23—355                              12 Claims

ABSTRACT OF THE DISCLOSURE

An improved process and apparatus for preparing uranium dioxide powder suitable for use in the fabrication of fuel for nuclear reactors. In a process comprising steps of hydrolyzing uranium hexafluoride to form an aqueous uranyl fluoride solution, treating with ammonia to precipitate ammonium diuranate, dewatering and drying the precipitate, and finally calcining the precipitate to form uranium dioxide, the improvement wherein the precipitate is dewatered to about 40% to about 60% by weight, preferably about 50% by weight water and is thereafter directly calcined.

BACKGROUND OF THE INVENTION

Nuclear chain fission reactions and the reactors in which they take place are now well known. A typical nuclear reactor includes a chain reacting assembly or core made up of fissile fuel material contained in fuel elements. The fuel material, in the form of pellets or granules, is generally encased in a corrosion resistant heat conductive shell or cladding. The reactor core, made up of a plurality of these elements in spaced relationship, is enclosed in a container through which the reactor coolant flows. As the coolant passes between the spaced fuel elements, it is heated by thermal energy released in the fuel material during the fission reaction. The heated coolant then leaves the reactor core, the heat energy is used to perform useful work and the now-cooled coolant is recycled back to the reactor core.

The fissile material used in the fuel of many commercial reactors is the U-235 isotope. Natural uranium, containing about 0.7% U-235 in U-238, may be used as fuel in some reactors. Large water-cooled power reactors, however, generally use uranium in which the U-235 content has been increased. This enriched uranium is most commonly available in the form of uranium hexafluoride. The $UF_6$ must undergo complex chemical processing to $UO_2$ having physical characteristics suitable for use in reactor fuel. The $UO_2$ must be very pure and have a consistent oxygen-to-uranium atomic ratio. Desirably, it should be possible to adjust the O-to-U ratio over a range of about 2 to about 2.3.

It is important that the $UO_2$ produced be sinterable or pressable to a selected density in the range of 80–97% of the theoretical maximum density of $UO_2$. While the physical and chemical characteristics necessary in a $UO_2$ powder which result in high density sintering are not fully understood, it is known that some $UO_2$ preparation processes give a product having much better sinterability than do others.

Uranium dioxide powder having excellent nuclear fuel fabrication characteristics has been prepared by the following process. Uranium hexafluoride in solid form is first vaporized. The vapor is brought into contact with water, where it is hydrolized forming a dilute aqueous solution of uranyl fluoride ($UO_2F_2$). This solution is then treated with ammonia to precipitate ammonium diuranate. While any desired concentration of ammonia may be used, it has recently been found that improved results are obtained where a dilute ammonia solution is added to the dilute aqueous uranyl fluoride solution. This improvement is further detailed in the copending application of W. R. De Hollander, Ser. No. 447,360, filed Apr. 12, 1966. The aqueous slurry is dewatered, preferably in a scroll centrifuge. The resulting paste is dried, using a belt or drum dryer. The dried ammonium diuranate is fed to a rotary calciner which removes water, ammonia, and residual fluoride and produces a free flowing $UO_2$ powder.

This powder is very pure and is easily sintered to produce high density pellets and granules. However, further improvements in the system can be achieved. In a continuous, large scale system, small simplifications in the process and equipment will result in large long-term savings in cost and materials. In particular, the step of drying the dewatered ammonium diuranate has caused problems.

Drying the slurry from the centrifuge tended to be slow and cause product non-uniformity. Large pieces of dried ammonium diuranate tend to oxidize non-uniformly in the calciner, with a burnt-appearing surface and an incompletely oxidized center. Also, significant fluoride carryover occurred in the particles. The centrifuge output tends to be irregular, since masses of dewatered ammonium diuranate intermittently break away and fall to the dryer. Thus, the size of dried pieces of ammonium diuranate leaving the dryer are irregular.

Attempts to pass the dewatered ammonium diuranate directly to the calciner have not been successful. Centrifuge output varies widely because of the irregular release of various sizes of dewatered masses of ammonium diuranate from the centrifuge which tend to oxidize non-uniformly. The rotary calciner operates most efficiently with a steady feed. Also, the large wet masses of ammonium diuranate slurry tends to stick to the calciner wall during drying. This results in removal problems, undesirably high fluoride content in the unevenly oxidized material and in the production of undesired agglomerates.

Thus, there is a continuing need for improved methods and apparatus for producing high quality uranium dioxide, especially in the dewatering-drying-calcining steps.

SUMMARY OF THE INVENTION

It is, therefore, an object of this invention to provide a system for preparing $UO_2$ which overcomes the above problems.

Another object of this invention is to provide a simpler and more economical system for preparing $UO_2$ suitable for use as nuclear reactor fuel.

Another object of this invention is to provide a $UO_2$ production system which limits the carryover of residual fluorides to the product.

Still another object of this invention is to provide a $UO_2$ production system capable of a higher throughput rate than conventional systems.

Yet another object of this invention is to provide a system which produces $UO_2$ of improved uniformity and sinterability.

The above objects, and others, are accomplished in accordance with this invention by providing an improved method and apparatus for producing high quality $UO_2$ from $UF_6$ wherein thickened ammonium diuranate slurry from the dewatering means is collected in a hopper which feeds a constant displacement pump which pumps the slurry as small particles directly into the center of a rotary calciner for conversion to uranium dioxide. The pump provides a steady flow to the calciner despite irregular output from the dewatering means. Feeding the slurry as small particles into the center of the calciner tube results in paste-like pellets having a substantially dry surface when they fall to the wall of the calciner. These pellets do not stick to the calciner wall or agglomerate. As the pellets tumble in the rotary calciner, all sides are evenly contacted by the hot gases, resulting in excellent oxidation of the uranium to $UO_2$ and efficient removal of water, ammonia and residual fluorides. It appears that the surfaces of the pellets flash dry as they fall from the pump feed outlet to the lower wall of the rotating calciner tube. It has been found that this steady feed of small, uniform quantities into the calciner permits much higher throughput rates and much more uniform product characteristics than did the prior irregular feed processes.

BRIEF DESCRIPTION OF THE DRAWING

Details of the invention will be further understood upon reference to the drawing, wherein.

DETAILED DESCRIPTION OF THE INVENTION

Figure 1:
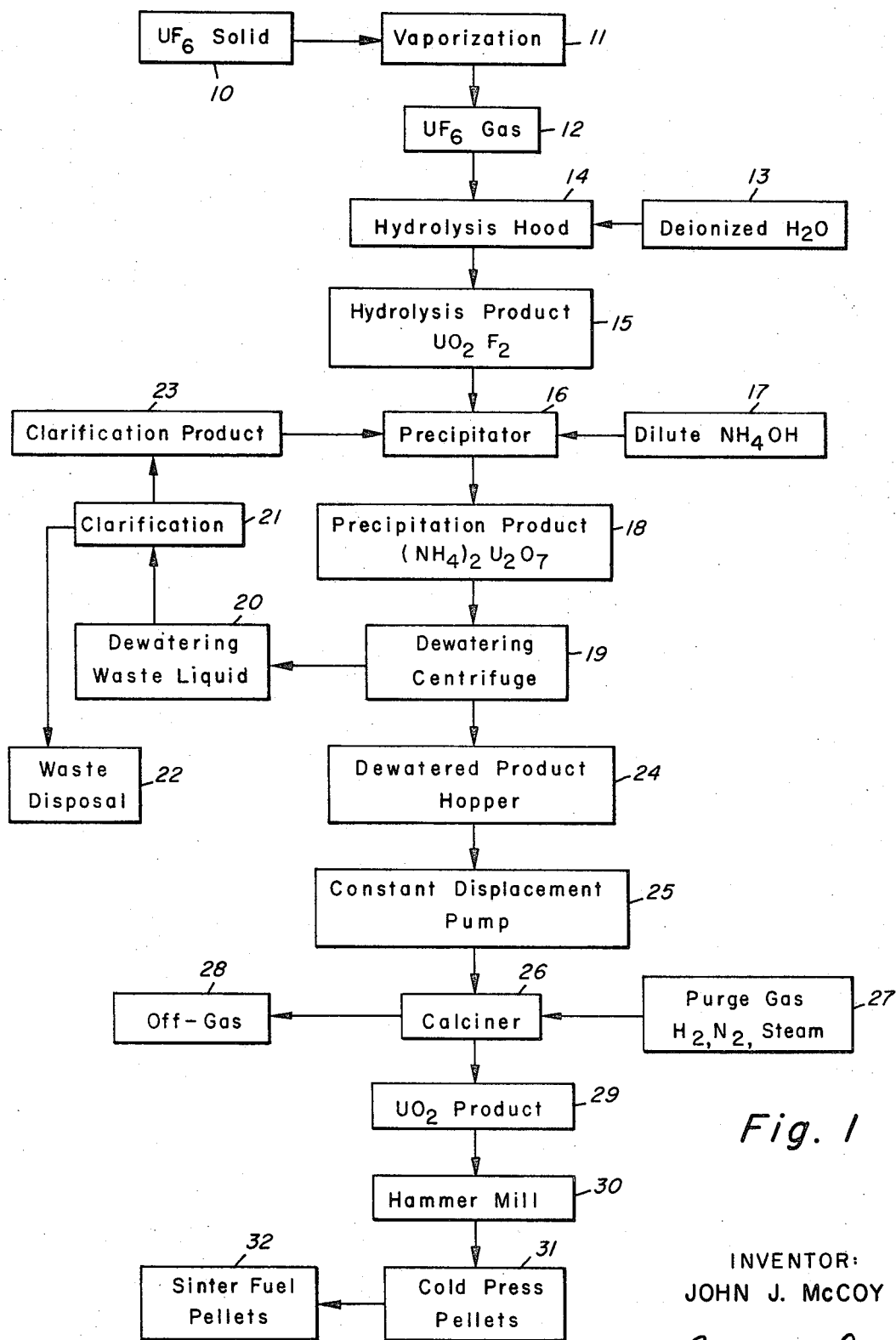
FIG. 1 shows a flow sheet for the overall improved $UO_2$ nuclear fuel process.

Referring now to FIG. 1, there is seen a block-diagram flow sheet for a process for manufacturing $UO_2$ fuel pellets, starting with $UF_6$ gas.

A cylinder 10 of solid $UF_6$, having the desired U-235 enrichment, is heated to vaporize the $UF_6$ as indicated in block 11, forming $UF_6$ gas 12. The $UF_6$ gas is bubbled through deionized water 13 in a hydrolysis hood 14, forming an aqueous solution of uranyl fluoride ($UO_2F_2$) and hydrofluoric acid (HF). This hydrolysis product 15 is pumped to a precipitation chamber 16. Dilute aqueous ammonia 17 is added to the precipitator, resulting in precipitation of ammonium diuranate [$(NH_4)_2U_2O_7$]. This precipitation product 18, in the form of a thin slurry consisting of about 2% finely divided solid ammonium diuranate and about 98% liquid (by weight) is dewatered in a conventional scroll-type centrifuge 19. The thickened output consists of about 40% to about 60% by weight solids with the balance liquid and preferably about 50% solids and about 50% liquid by weight. The dewatering waste liquid 20 removed in dewatering centrifuge 19 is sent to a clarification station 21 where waste, primarily water, is sent to a waste disposal system 22 and the clarification product 23, primarily dilute aqueous ammonia, is recycled to precipitator 16.

Meanwhile, the thickened slurry drops from the centrifuge in irregularly-sized masses into a hopper 24. The slurry is continuously agitated in hopper 24 to prevent settling of the particulate ammonium diuranate, which would form a hard sedimentary layer, plugging hopper 24 and the slurry output line from the hopper.

The thickened slurry is pumped by means of a conventional positive-displacement pump 25 of the type used to pump highly viscous materials, such as thick grease and peanut butter. Pump 25 feeds the slurry to a small outlet or group of outlets, each having a diameter of less than about 1 inch, located at about the center of a conventional tube-type rotary calciner 26.

As the slurry leaves the outlet, small pellet-shaped pieces break off and fall to the calciner wall. Apparently, as the pellets fall, their surfaces are flash dried so that they do not stick to the wall of the calciner nor do they agglomerate. As the pellets tumble in the rotating calciner, all surfaces are uniformly contacted by the hot gas stream, resulting in uniform oxidation and removal of residual ammonia and fluorides. In order to obtain a uniform product, the pellet diameter should be less than about 1 inch. Best results have been obtained with pellets having a diameter of less than about ½ inch. The slurry may either be extruded from one or more nozzles into the calciner or may, if desired, be sprayed as very small particles into the calciner.

The calciner is a conventional rotating tube calciner, having a diameter of up to about 10 inches. The calciner is maintained at a temperature above about 1000° F.; typically by means of external gas burners. Heated purge gas 27, typically a mixture of hydrogen, nitrogen and steam, is flowed counter-currently through the calciner and out to an off-gas disposal means 28. The $UO_2$ product 29 exiting the calciner is in the form of highly uniform pellets. The O-to-U atom ratio can be adjusted as desired by varying calciner conditions.

The $UO_2$ product 29 is directed to a hammer mill 30, where particle size is reduced to a diameter of about 1 to 10 microns. The resulting powder is cold pressed into preform pellets 31, then sintered at a temperature of about 3000° F. to form nuclear fuel pellets. The fuel pellets thus produced sinter to a uniform high density.

Figure 2:
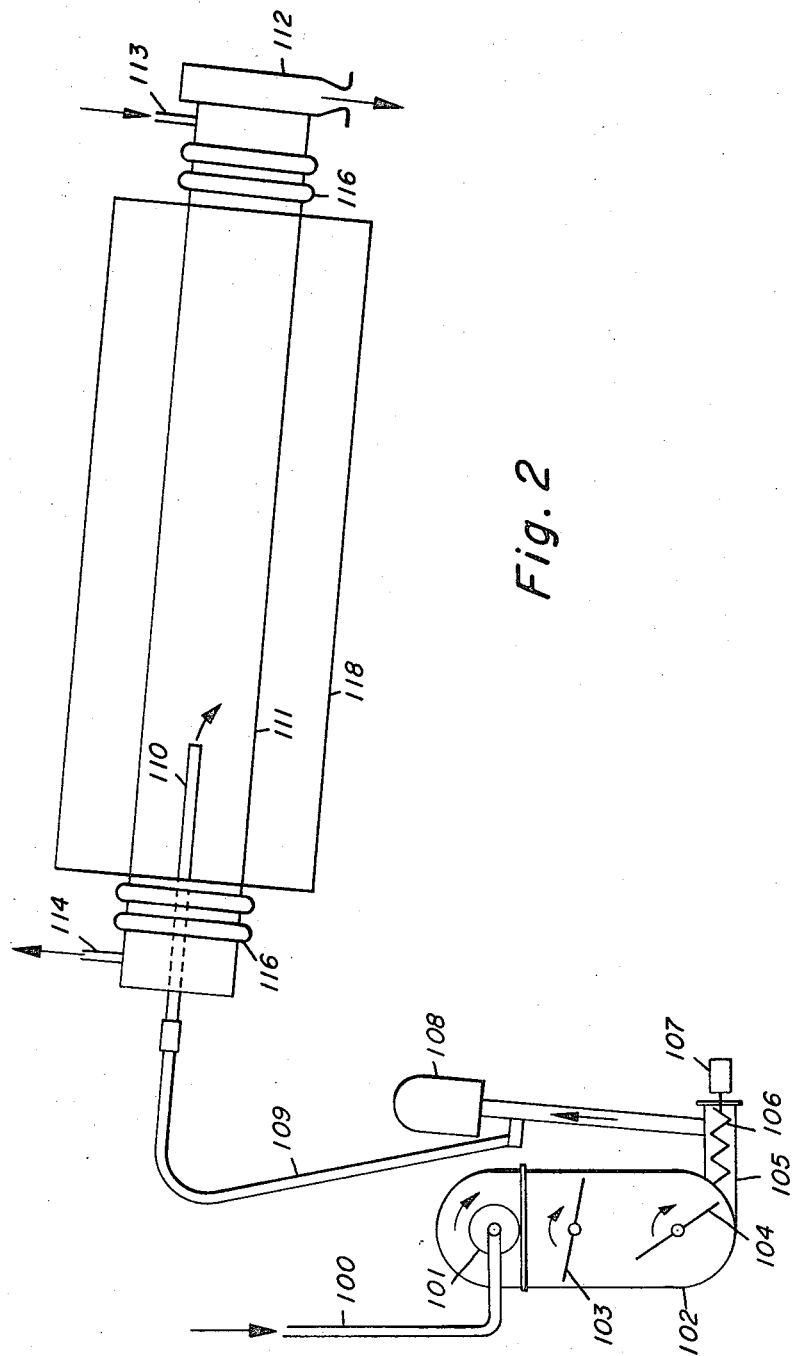
FIG. 2 shows a schematic representation of the improved system for preparing uranium dioxide from an ammonium diuranate slurry according to this invention.

FIG. 2 shows a schematic illustration of the means for dewatering the ammonium diuranate slurry, maintaining the slurry in suspension in a hopper, and feeding the slurry to a rotary calciner.

As seen in FIG. 2, the thin slurry from the precipitator is fed through pipe 100 to a conventional scroll-type centrifuge 101. As the centrifuge rotates, a thickened paste-like slurry forms on the outside of the centrifuge and drops in masses of various sizes into hopper 102. Liquid removed in centrifuge 101 is directed to a clarification system, as described above, through a pipe (not shown). Two rotating paddles 103 and 104 continuously agitate the slurry in hopper 102 to prevent settling of the ammonium diuranate in the slurry, which would fill the bottom of the hopper with a hard sedimentary layer which would plug outlet line 105. The slurry leaves hopper 102 through outlet line 105, which contains a rotating helical wire agitator 106 driven by drive means 107. A positive displacement pump 108 pumps the slurry through line 109 to outlet pipe 110 within rotary calciner 111. Pellet-like masses fall from outlet pipe 110 to the lower calciner wall. As calciner 111 rotates between stationary seals 116, the pellets tumble and gradually move toward discharge opening 112. The calciner is maintained at a high temperature by conventional heating means (not shown), within outer housing 118. Purge gases enter calciner 111 through line 113 and leave through line 114 to an off-gas system. Thus, slurry which leaves centrifuge 101 in intermittent, irregularly sized masses is fed into calciner 111 as uniform pieces which dry sufficiently before they fall to the wall of calciner 111 to prevent sticking and agglomeration. The product discharged is highly uniform in chemical and physical characteristics.

DESCRIPTION OF A PREFERRED EMBODIMENT

Example

A cylinder containing solid $UF_6$, suitably enriched in the U-235 isotope, is electrically heated in a vented hood to a temperature of about 200° C. to form $UF_6$ gas, which is bubbled through deionized water held in a tank having a non-reactive lining in a vented hood. Here, the $UF_6$ is hydrolized to form an aqueous solution of uranyl fluoride ($UO_2F_2$) and hydrofluoric acid (HF). The uranium concentration in the solution is about 1 pound per gallon.

Following hydrolysis, the $UO_2F_2$ solution is pumped to an unhooded storage tank, from which it is pumped to a precipitation chamber. The precipitator has a relatively low-volume, since it serves only to insure complete mixing and blending.

Concentrated aqueous ammonia (about 15 molar) from a storage tank is thoroughly mixed with recycled ammonia solution (described in detail below) from a recycle storage tank. The ammonia solution is diluted to a concentration of about 1 molar.

The dilute ammonia solution is added to the precipitation chamber where the uranium is precipitated as ammonium diuranate [$(NH_4)_2U_2O_7$]. The slurried

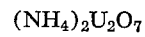

dispersion is then pumped to a stainless steel surge tank for a hold period of about 1 hour to allow optimum crystal growth. The slurry containing about 2% by weight $(NH_4)_2U_2O_7$ crystals is then transferred to a continuous scroll centrifuge.

The centrifuge dewaters the slurry, discharging random sized masses of thickened slurry containing about 50% $(NH_7)_2U_2O_7$ crystals, by weight. The liquid removed is sent to a storage tank for clarification and recycling, as described below.

The thickened slurry is continuously collected and agitated in the hopper to prevent settling. The slurry passes through a tube from the bottom of the hopper to the inlet of a pneumatic piston type positive displacement pump. Typical suitable pneumatic positive-displacement pumps includes model 7896S, available from the Alemite Division of Stewart Warner Corporation. The slurry is continuously agitated in the tube by means of a rotating helical wire agitator.

The pump continuously pumps the slurry through a pipe terminating in an opening, having a diameter of about ½", located on about the centerline, near the upstream end, of a rotary tube-type calcining furnace. The pipe enters through a connector at the end of the calciner which allows easy withdrawal, should the pipe become plugged. The slurry is fed at a rate which results in the production of from 70–100 pounds of $UO_2$ per hour. As the slurry is extruded through the opening, small approximately cylindrical pellets break off and fall to the bottom wall of the calciner. Apparently, the pellet surfaces flash-dry as the pellets fall, since they do not stick to the calciner wall and do not agglomerate.

The calciner furnace consists of an Inconel tube having about a 10 inch internal diameter and about a 26 foot length. Such a calciner furnace is available from Bartlett and Snow, Inc. The tube slopes about 1½° from horizontal and is rotated at about 2 revolutions per minute. The tube is maintained at about 1200° F. by external heating means. A mixture of hydrogen, nitrogen and steam is flowed through the calciner, counter-current to product flow. The composition of the gas mixture and the temperature of the calciner may be varied slightly in order to vary the U-to-O atom ratio of the product.

Off gas from the calciner carries $NH_4F \cdot H_2O$, $H_2$, $N_2$, and $NH_3$. It is passed through a water type scrubber prior to being vented up a stack.

Uniform heating and gas content is very important. If the temperature is too high and/or particles too small, the $UO_2$ powder produced will have poor ceramic quality, e.g., it will not sinter to form a uniform, high-density pellet. If the temperature is too low, and/or some particles too large, too much fluorine is left in the product. Excess fluorine tends to chemically attack the cladding containing the fuel material when in use in a nuclear reactor. Thus, temperature is necessarily a compromise. It is important that the slury be fed to the calciner, as uniformly sized particles to insure even heating, uniform oxidation and maximum fluoride removal.

The $UO_2$ leaving the calciner is found to have uniform particle size and a uniform O-to-U atom ratio. Fluoride content is found to be well below 100 p.p.m.

The particles are passed to a conventional hammer mill, where particle size is reduced to about 1–2 microns.

The particles are formed into "green pellets" in a conventional pelleting press. About 0.2% of a stearic acid base die lubricant is blended with the powder before cold pressing. The compacts are placed in a molybdenum boat and passed through a muffle furnace maintained at about 800° F. to remove the lubricant. The compacts are then sintered at about 3000° F. for about 3 hours. The resulting fuel pellets are found to have a density of about 98% of the maximum theoretical density of $UO_2$ and to have excellent mechanical strength, with little chipping or cracking.

Meanwhile, the aqueous overflow waste stream from the dewatering centrifuge is accumulated in a storage tank. This solution contains small amounts of $(NH_4)_2U_2O_7$, $NH_4F$ and $NH_4OH$. This solution is delivered to a high-speed clarification centrifuge where most of the $$(NH_4)_2U_2O_7$$

is removed as an underflow and returned to the precipitator along with some $NH_4F$, $NH_4OH$ and water. The clarified aqueous waste stream overflow from the clarification centrifuge is passed through an ion exchanger which removes most of the dissolved $(NH_4)_2U_2O_7$, which is then recovered as $UO_2(NO_3)_2$ when the ion exchanger is regenerated with nitric acid. Thereafter, the $UO_2(NO_3)_2$ is mixed with $NH_4OH$ to precipitate $(NH_4)_2U_2O_7$, which may be sent to the precipitator output line.

Deionized waste water from the ion exchanger is pumped into a holdign tank. Hydrated lime is added in slightly less than the required stoichiometric amount to precipitate fluorine in the deionized waste as calcium fluoride ($CaF_2$). The lime slurry waste is pumped to a thickener where $CaF_2$ and a trace of $CaU_2O_7$ settle as a sludge. The sludge is collected in containers and sent to waste burial. The thickener overflow is primarily a dilute aqueous ammonia solution, with traces of $CaU_2O_7$, $NH_4F$ and $CaF_2$. This solution is returned to the dilute ammonia mixing tank to form the dilute ammonia solution used in the precipitator, as described above.

It has been found this process produces a product of much improved uniformity and sinterability. Also, the incorporation of the process improvements of this invention have been found to increase the output of an existing production line from about 35 pounds per hour to about 70–100 pounds per hour.

Although specific components and proportions have been described in the above example, other suitable materials and conditions, as indicated above, may be used with similar results. In addition, other materials may be included in the various process solutions, gases, etc., to enhance or otherwise modify their properties.

Other modifications and ramifications of the present invention will occur to those skilled in the art upon reading this disclosure. These are intended to be included within the scope of the invention.

I claim:

1. A process for preparing $UO_2$ from ammonium diuranate which comprises the steps of:
   (a) thickening a slurry comprising ammonium diuranate and water to a solids content between about 40% and about 60% by weight;
   (b) collecting the thickened slurry in a hopper zone;
   (c) continuously agitating the thickened slurry to maintain a uniform mixture in said hopper zone;
   (d) pumping the thickened slurry without further drying from said hopper zone through at least one outlet opening as paste-like pellets into a calcination zone; and
   (e) maintaining in said calcination zone a temperature of above about 1000° F. and a flow of a gas containing hydrogen whereby said ammonium diuranate is uniformly reduced substantially to $UO_2$, and residual water and fluorides are substantially entirely removed therefrom.

2. The process of claim 1 in combination with the step of continuously agitating said thickened slurry while pumping it through an outlet zone from said hopper zone.

3. The process of claim 1 wherein said calcination zone is rotated at a rate of about 2 revolutions per minute.

4. The process of claim 1 wherein the gas passing through said calcination zone comprises a mixture of $H_2$, $N_2$, and steam and flows therethrough countercurrent to said thickened slurry.

5. In a process of preparing uranium dioxide from uranium hexafluoride which comprises the steps of evaporating solid uranium hexafluoride, hydrolizing said uranium hexafluoride to form uranyl fluoride, treating said uranyl fluoride with an aqueous ammonia solution to form a water suspension of ammonium diuranate, and subsequently calcining said ammonium diuranate in a calcination zone to form a uranium oxide; the improvement comprising the steps of dewatering said suspension to form a thickened slurry of ammonium diuranate having a solids content of between about 40% and about 60% by weight, collecting said thickened ammonium diuranate slurry in a hopper zone, continuously agitating said thickened slurry to maintain a uniform mixture in said hopper zone, and pumping said slurry from said hopper zone through at least one outlet opening, so as to form substantially uniformly sized paste-like pellets, into the inlet of said calcination zone.

6. The process of claim 5 in combination with the step of agitating said thickened slurry continuously while pumping it through the outlet zone from said hopper zone.

7. The process of claim 5 wherein said calcination zone is rotated at a rate of about 2 revolutions per minute.

8. The process of claim 5 in combination with the step of passing a gas comprising a mixture of $H_2$, $N_2$, and steam countercurrently through said calcination zone.

9. In a process of preparing uranium dioxide from uranium hexafluoride which comprises the steps of evaporating solid uranium hexafluoride, hydrolizing said uranium hexafluoride to form uranyl fluoride, treating said uranyl fluoride with an aqueous ammonia solution to form a water suspension of ammonium diuranate, and subsequently calcining said ammonium diuranate in a calcination zone to form a uranium oxide; the improvement which comprises dewatering said suspension to form a thickened ammonium diuranate slurry having a solids content of between about 40% and about 60% by weight, and pumping said slurry, without further treatment through at least one outlet opening so as to form substantially uniformly sized paste-like pellets, into said calcination zone.

10. The process of claim 9 wherein said thickened slurry contains about 50% water.

11. The process of claim 9 wherein said paste-like pellets are allowed to fall in contact with the gases present in said calcination zone prior to their contacting previously introduced pellets present in said zone.

12. The process of claim 9 wherein said thickened slurry is sprayed into said calcination zone.

References Cited

UNITED STATES PATENTS

| | | | |
|---|---|---|---|
| 3,037,839 | 6/1962 | Googin | 23—354 |
| 2,953,430 | 9/1960 | Leaders et al. | 23—355 |

OTHER REFERENCES

Galkin et al.: Technology of Uranium, AEC-TR-6638, Jerusalem, 1966, pgs. 264–5, 358–9.

CARL D. QUARFORTH, Primary Examiner

F. M. GITTES, Assistant Examiner

U.S. Cl. X.R.

23—354, 335